United States Patent
Pratas et al.

(10) Patent No.: US 11,616,562 B1
(45) Date of Patent: Mar. 28, 2023

(54) MULTI-LINK ESTABLISHMENT FOR SIDELINK ENHANCEMENT

(71) Applicant: NOKIA TECHNOLOGIES OY, Espoo (FI)

(72) Inventors: Nuno Manuel Kiilerich Pratas, Gistrup (DK); Oana-Elena Barbu, Aalborg (DK); Benny Vejlgaard, Gistrup (DK); Daniel Medina, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/531,467

(22) Filed: Nov. 19, 2021

(51) Int. Cl.
  *H04B 7/06* (2006.01)
  *H04W 76/15* (2018.01)
  *H04W 72/04* (2023.01)

(52) U.S. Cl.
  CPC ......... *H04B 7/0695* (2013.01); *H04B 7/0621* (2013.01); *H04W 72/0406* (2013.01); *H04W 76/15* (2018.02)

(58) Field of Classification Search
  CPC ............... H04B 7/0695; H04B 7/0621; H04W 72/0406; H04W 76/15
  See application file for complete search history.

(56) References Cited

U.S. PATENT DOCUMENTS

| | | | | |
|---|---|---|---|---|
| 9,071,291 | B2* | 6/2015 | Zhu | H04W 72/1278 |
| 2011/0211487 | A1* | 9/2011 | Han | H04W 16/28 370/252 |
| 2019/0190577 | A1* | 6/2019 | Wang | H04W 74/0833 |

OTHER PUBLICATIONS

3GPP TS 38.212 V16.7.0 (Sep. 2021), 3rd Generation Partnership Project; Technical Specification Group Radio Access Network; NR; Multiplexing and Channel Coding (Release 16); 3GPP, 5G, 153 pages.

(Continued)

*Primary Examiner* — Vineeta S Panwalkar
(74) *Attorney, Agent, or Firm* — Squire Patton Boggs (US) LLP

(57) ABSTRACT

Systems, methods, apparatuses, and computer program products for multi-link establishment for sidelink (SL) enhancement. A method may include transmitting, to a user equipment, a coordination request for communication over a plurality of beams. Beamformed reference signals may be exchanged with the user equipment identifying corresponding beams of the apparatus and the user equipment. Coordination information comprising at least one of preferred or non-preferred time-frequency-beam resources of the user equipment may be received from the user equipment including preferred or non-preferred radio resources of the user equipment and associated simultaneous links for their communication. At least one of preferred or non-preferred time-frequency-beam resources may be determined for their communication. At least two time-frequency-beam resources associated with different beams of the plurality of beams may be selected based on the at least one of determined preferred or non-preferred time-frequency-beam resources of the apparatus. Data in the selected at least two time-frequency-beam resources associated with different beams of the plurality of beams may be transmitted to the user equipment.

20 Claims, 14 Drawing Sheets

(56) References Cited

OTHER PUBLICATIONS

3GPP TS 38.214 V16.7.0 (Sep. 2021), 3rd Generation Partnership Project; Technical Specification Group Radio Access Network; NR; Physical Layer Procedures for Data (Release 16), 3GPP, 5G, 172 pages.

3GPP TS 38.321 V16.6.0 (Sep. 2021), 3rd Generation Partnership Project; Technical Specification Group Radio Access Network; NR; Medium Access Control (MAC) protocol specification (Release 16), 3GPP, 5G, 158 pages.

Minyoung Park, et al., "A Spatial Diversity Technique for IEEE 802.11ad WLAN in 60 GHz Band", IEEE Communications Letters, vol. 16, No. 8, Aug. 2012, 3 pages, DOI: 10.1109/LCOMM.2012.060112.120793.

Zhenyu Ziao, et al., "Multipath Grouping for Millimeter-Wave Communications", Globecom 2013—Signal Processing for Communications Sumposium, 6 pages.

* cited by examiner

| Scenario | LOS blocked[1] | Reflector (material) | $P_{rz}/P_{tx}$ (dB) | Gain over S2 (dB) |
|---|---|---|---|---|
| S1 | No | No | -9.5 dB | - |
| S2 | Yes | No | -24 dB | - |
| S3 | Yes | Yes (Copper) | -12 dB | 12 dB |
| S4 | Yes | Yes (Whiteboard) | -16 dB | 8 dB |
| S5 | Yes | Yes (Wood) | -19.5 dB | 4.5 dB |

[1] The LOS path was partially blocked due to a small anechoic chamber.

MULTI-LINK ESTABLISHMENT FOR SIDELINK ENHANCEMENT

FIELD

Some example embodiments may generally relate to mobile or wireless telecommunication systems, such as Long Term Evolution (LTE) or fifth generation (5G) new radio (NR) access technology, or other communications systems. For example, certain example embodiments may relate to apparatuses, systems, and/or methods for multi-link establishment for sidelink (SL) enhancement.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or 5G radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

In accordance with some example embodiments, a method may include transmitting, from a first user equipment to a second user equipment, a coordination request for communication over a plurality of beams. The method may further include exchanging, with the second user equipment, beamformed reference signals for identifying corresponding beams of the first user equipment and the second user equipment. The method may further include receiving, from the second user equipment, coordination information comprising at least one of preferred or non-preferred time-frequency-beam resources of the second user equipment for their communication. The method may further include determining, by the first user equipment, at least one of preferred or non-preferred time-frequency-beam resources of the first user equipment for their communication. The method may further include selecting, based on the at least one of preferred or non-preferred time-frequency-beam resources of the first user equipment, and the received coordination information, at least two time-frequency-beam resources associated with different beams of the plurality of beams. The method may further include transmitting, to the second user equipment, data in the selected at least two time-frequency-beam resources.

In accordance with certain example embodiments, an apparatus may include means for transmitting, to a first user equipment, a coordination request for communication over a plurality of beams. The apparatus may further include means for exchanging, with the first user equipment, beamformed reference signals for identifying corresponding beams of the apparatus and the first user equipment. The apparatus may further include means for receiving, from the first user equipment, coordination information comprising at least one of preferred or non-preferred time-frequency-beam resources of the first user equipment for their communication. The apparatus may further include means for determining at least one of preferred or non-preferred time-frequency-beam resources of the apparatus for their communication. The apparatus may further include means for selecting, based on the at least one of preferred or non-preferred time-frequency-beam resources of the apparatus, and the received coordination information, at least two time-frequency-beam resources associated with different beams of the plurality of beams. The apparatus may further include means for transmitting, to the first user equipment, data in the selected at least two time-frequency-beam resources.

In accordance with various example embodiments, a non-transitory computer readable medium may be encoded with instructions that may, when executed in hardware, perform a method. The method may include transmitting, to a first user equipment, a coordination request for communication over a plurality of beams. The method may further include exchanging, with the first user equipment, beamformed reference signals for identifying corresponding beams of the first user equipment. The method may further include receiving, from the first user equipment, coordination information comprising at least one of preferred or non-preferred time-frequency-beam resources of the first user equipment for their communication. The method may further include determining at least one of preferred or non-preferred time-frequency-beam resources for their communication. The method may further include selecting, based on the at least one of preferred or non-preferred time-frequency-beam resources, and the received coordination information, at least two time-frequency-beam resources associated with different beams of the plurality of beams. The method may further include transmitting, to the first user equipment, data in the selected at least two time-frequency-beam resources.

In accordance with some example embodiments, a computer program product may perform a method. The method may include transmitting, to a first user equipment, a coordination request for communication over a plurality of beams. The method may further include exchanging, with the first user equipment, beamformed reference signals for identifying corresponding beams of the first user equipment. The method may further include receiving, from the first user equipment, coordination information comprising at least one of preferred or non-preferred time-frequency-beam resources of the first user equipment for their communication. The method may further include determining at least one of preferred or non-preferred time-frequency-beam resources of the apparatus for their communication. The method may further include selecting, based on the at least one of preferred or non-preferred time-frequency-beam resources of the apparatus, and the received coordination information, at least two time-frequency-beam resources associated with different beams of the plurality of beams. The method may further include transmitting, to the first user equipment, data in the selected at least two time-frequency-beam resources.

In accordance with certain example embodiments, an apparatus may include at least one processor and at least one memory including computer program code. The at least one memory and the computer program code may be configured to, with the at least one processor, cause the apparatus to at least transmit, to a first user equipment, a coordination request for communication over a plurality of beams. The at least one memory and the computer program code may be further configured to, with the at least one processor, cause the apparatus to at least exchange, with the first user equipment, beamformed reference signals for identifying corresponding beams of the apparatus and the first user equipment. The at least one memory and the computer program code may be further configured to, with the at least one processor, cause the apparatus to at least receive, from the first user equipment, coordination information comprising at least one of preferred or non-preferred time-frequency-beam resources of the first user equipment for their communication. The at least one memory and the computer program code may be further configured to, with the at least one processor, cause the apparatus to at least determine at least one of preferred or non-preferred time-frequency-beam resources of the apparatus for their communication. The at least one memory and the computer program code may be further configured to, with the at least one processor, cause the apparatus to at least select, based on the at least one of preferred or non-preferred time-frequency-beam resources of the apparatus, and the received coordination information, at least two time-frequency-beam resources associated with different beams of the plurality of beams. The at least one memory and the computer program code may be further configured to, with the at least one processor, cause the apparatus to at least transmit, to the first user equipment, data in the selected at least two time-frequency-beam resources.

In accordance with various example embodiments, an apparatus may include circuitry configured to transmit, to a first user equipment, a coordination request for communication over a plurality of beams. The circuitry may further be configured to exchange, with the first user equipment, beamformed reference signals for identifying corresponding beams of the apparatus and the first user equipment. The circuitry may further be configured to receive, from the first user equipment, coordination information comprising at least one of preferred or non-preferred time-frequency-beam resources of the first user equipment for their communication. The circuitry may further be configured to determine at least one of preferred or non-preferred time-frequency-beam resources of the apparatus for their communication. The circuitry may further be configured to select, based on the at least one of preferred or non-preferred time-frequency-beam resources of the apparatus, and the received coordination information, at least two time-frequency-beam resources associated with different beams of the plurality of beams. The circuitry may further be configured to transmit, to the first user equipment, data in the selected at least two time-frequency-beam resources.

In accordance with some example embodiments, a method may include receiving, from a user equipment, a coordination request for communication over a plurality of beams. The method may further include exchanging, with the user equipment, beamformed reference signals for identifying corresponding beams of the apparatus and the user equipment. The method may further include transmitting, to the user equipment, coordination information comprising at least one of preferred or non-preferred time-frequency-beam resources of the apparatus for their communication. The method may further include receiving, from the user equipment, data in at least two time-frequency-beam resources associated with different beams of the plurality of beams.

In accordance with certain example embodiments, an apparatus may include means for receiving, from a user equipment, a coordination request for communication over a plurality of beams. The apparatus may further include means for exchanging, with the user equipment, beamformed reference signals for identifying corresponding beams of the apparatus and the user equipment. The apparatus may further include means for transmitting, to the user equipment, coordination information comprising at least one of preferred or non-preferred time-frequency-beam resources of the apparatus for their communication. The apparatus may further include means for receiving, from the user equipment, data in at least two time-frequency-beam resources associated with different beams of the plurality of beams.

In accordance with various example embodiments, a non-transitory computer readable medium may be encoded with instructions that may, when executed in hardware, perform a method. The method may include receiving, from a user equipment, a coordination request for communication over a plurality of beams. The method may further include exchanging, with the user equipment, beamformed reference signals for identifying corresponding beams of the user equipment. The method may further include transmitting, to the user equipment, coordination information comprising at least one of preferred or non-preferred time-frequency-beam resources for their communication. The method may further include receiving, from the user equipment, data in at least two time-frequency-beam resources associated with different beams of the plurality of beams.

In accordance with some example embodiments, a computer program product may perform a method. The method may include receiving, from a user equipment, a coordination request for communication over a plurality of beams. The method may further include exchanging, with the user equipment, beamformed reference signals for identifying corresponding beams of the user equipment. The method may further include transmitting, to the user equipment, coordination information comprising at least one of preferred or non-preferred time-frequency-beam resources for their communication. The method may further include receiving, from the user equipment, data in at least two time-frequency-beam resources associated with different beams of the plurality of beams.

In accordance with certain example embodiments, an apparatus may include at least one processor and at least one memory including computer program code. The at least one memory and the computer program code may be configured to, with the at least one processor, cause the apparatus to at least receive, from a user equipment, a coordination request for communication over a plurality of beams. The at least one memory and the computer program code may be further configured to, with the at least one processor, cause the apparatus to at least exchange, with the user equipment, beamformed reference signals for identifying corresponding beams of the apparatus and the user equipment. The at least one memory and the computer program code may be further configured to, with the at least one processor, cause the apparatus to at least transmit, to the user equipment, coordination information comprising at least one of preferred or non-preferred time-frequency-beam resources of the apparatus for their communication. The at least one memory and the computer program code may be further configured to, with the at least one processor, cause the apparatus to at least receive, from the user equipment, data in at least two time-frequency-beam resources associated with different beams of the plurality of beams.

In accordance with various example embodiments, an apparatus may include circuitry configured to receive, from a user equipment, a coordination request for communication over a plurality of beams. The circuitry may further be configured to exchange, with the user equipment, beamformed reference signals for identifying corresponding beams of the apparatus and the user equipment. The circuitry may further be configured to transmit, to the user equipment, coordination information comprising at least one of preferred or non-preferred time-frequency-beam resources of the apparatus for their communication. The circuitry may further be configured to receive, from the user equipment, data in at least two time-frequency-beam resources associated with different beams of the plurality of beams.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for power saving for multi-link establishment for SL enhancement.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell," "node," "gNB," or other similar language throughout this specification may be used interchangeably.

Figure 1A:
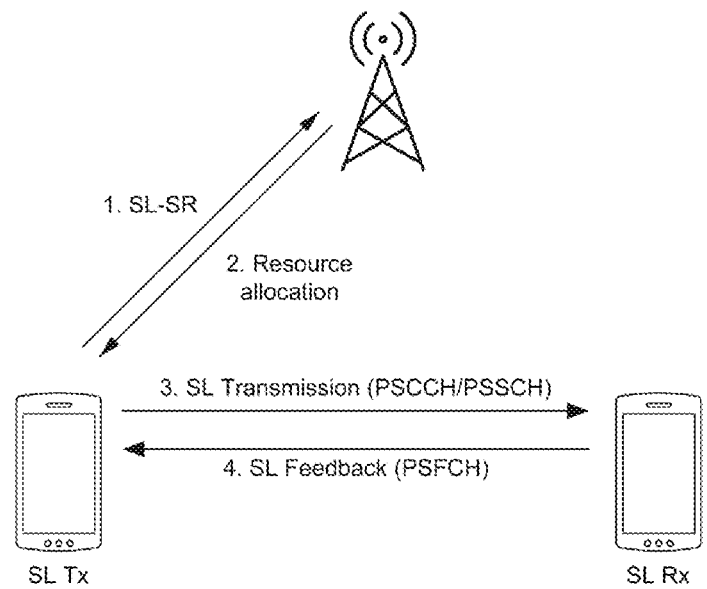
FIG. 1(a) illustrates an example new radio (NR) sidelink (SL) resource allocation.
Figure 1B:
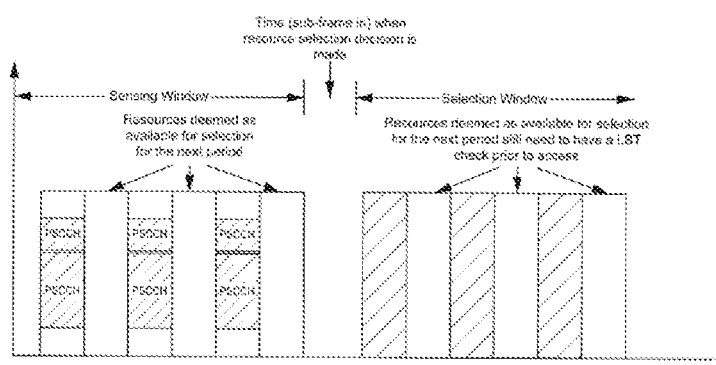
FIG. 1(b) illustrates another example NR SL resource allocation.

According to 3$^{rd}$ Generation Partnership Project (3GPP), new radio (NR) SL has been designed to facilitate a user equipment (UE) to communicate with other nearby UE(s) via direct/SL communication. Two resource allocation modes have been specified, and a SL transmitter (Tx) UE may be configured with one of them to perform its NR SL transmissions. These modes are denoted as NR SL mode 1 and NR SL mode 2. In particular, FIG. 1(a) illustrates an example NR SL resource allocation under mode 1, and FIG. 1(b) illustrates an example NR SL resource allocation under mode 2. In mode 1, a SL transmission resource is assigned by the network (NW) to the SL Tx UE, while a SL Tx UE in mode 2 autonomously selects its SL transmission resources. Additionally, in mode 1, where the gNB is responsible for the SL resource allocation, the configuration and operation is similar to the one over the Uu interface (see FIGS. 1(a) and 1(b)).

In mode 2, the SL UEs may perform the resource selection autonomously with the aid of a sensing procedure. More specifically, a SL Tx UE in NR SL mode 2 may first perform a sensing procedure over the configured SL transmission resource pool(s) to obtain the knowledge of the reserved resource(s) by other nearby SL Tx UE(s). Based on the knowledge obtained from sensing, the SL Tx UE may select resource(s) from the available SL resources, accordingly. In order for a SL UE to perform sensing and obtain the necessary information to receive a SL transmission, it may decode the sidelink control information (SCI).

3GPP describes certain enhancements for mode 2 in which the inter-UE coordination may be enhanced for improved reliability and reduced latency. In particular, in inter-UE coordination, a set of resources may be determined at UE A. This set may be sent to UE B in mode 2, and UE B may take this into account in the resource selection for its own transmission. This solution may be able to operate in-coverage, partial coverage, and out-of-coverage, and to address consecutive packet loss in various coverage scenarios.

Figure 2A:
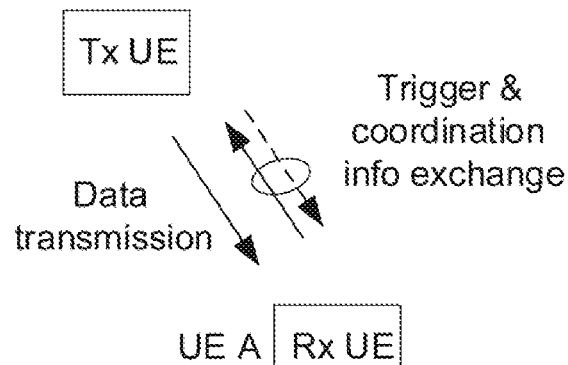
FIG. 2(a) illustrates an example inter-user equipment (UE) coordination scenario.
Figure 2B:
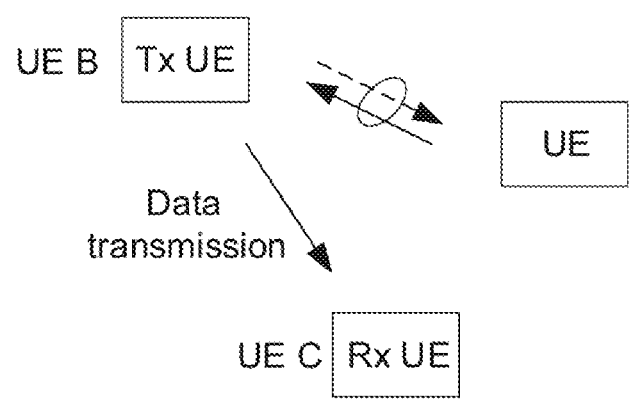
FIG. 2(b) illustrates an example of another inter-UE coordination scenario.

FIG. 2(a) illustrates an example inter-UE coordination scenario, and FIG. 2(b) illustrates an example of another inter-UE coordination scenario. In particular, in FIG. 2(a), the coordinating UE (UE A) is the intended receiver of UE B's transmission. On the other hand, in FIG. 2(b), the coordinating UE (UE A) is not the intended receiver of the UE B's transmission. In one of the inter-UE coordination scenarios (denoted in 3GPP as Inter-UE Coordination Scheme 1), illustrated in FIGS. 2(a) and 2(b) Error! Reference source not found., the UE A (Rx-UE) selects the preferred SL transmit resource(s) (e.g., according to its sensing), and recommends the selected resource(s) to UE B (Tx-UE), where UE B selects its SL transmit resource by taking into account the resource(s) indicated by UE A and in addition performing its own sensing (e.g., UE B may use or may not use the recommended resource(s) to transmit to UE A). Thus, by using the inter-UE coordination scheme, UE A may try to ensure there is no packet collision or strong interference over its selected resource(s) and, thus, the transmission from UE B to UE A can occur with high(er) reliability.

3GPP presents support for schemes of inter-UE coordination in mode 2. For instance, in Inter-UE Coordination Scheme 1, the coordination information sent from UE A to UE B is the set of resources preferred and/or non-preferred for UE B's transmission. Additionally, in Inter-UE Coordination Scheme 2, the coordination information sent from UE A to UE B is the presence of expected/potential and/or detected resource conflict on the resources indicated by UE B's SCI. Furthermore, there may be certain conditions for the UEs to be UE A(s)/UE B(s) for inter-UE coordination. For example, only UE(s) among the intended receiver(s) of UE B may be a UE A, any UE may be a UE A, high-layer configured, etc.

According to 3GPP, when UE B receives the inter-UE coordination from UE A, there may be several options for UE B to take into account in the resource (re)-selection for its own transmission. In particular, for scheme 1, a first option may be where UE B's resource(s) to be used for its transmission resource (re)-selection is based on both UE B's sensing result (if available), and the received coordination information. As a second option, UE B's resource(s) to be used for its transmission resource (re)-selection is based only on the received coordination information. Further, a third option includes the UE B's resource(s) to be re-selected based on the received coordination information. Further, a fourth option includes the UE B's resource(s) to be used for its transmission resource (re)-selection is based on the received coordination information.

As described in 3GPP, for scheme 2, UE B may determine resource(s) to be re-selected based on the received coordination information. In another option, the UE B may determine a necessity of retransmission based on the received coordination information.

The propagation environment at FR2 frequencies may be characterized by a dominant propagation component with very weak sub-components. The reason for this is two-fold: (i) the transmissions in FR2 are beamformed, which concentrates the radiated energy in the beamformed direction, and therefore reduces the probability that the transmitted signals will encounter reflection clusters; and (ii) the receiver also applies beamforming at its receiver, and therefore the reflections from any reflection clusters coming from directions other than the Rx beamformed direction will be severely attenuated. The dominant propagation component can either be the line of sight (LoS) component (when there is no LoS obstruction), or a reflector path (when there is LoS obstruction). Therefore, if this dominant propagation component suffers any blockages, the link may fail.

SL communications (such as in V2X and public safety scenarios) may be characterized by the Tx and Rx being at pedestrian height, in contrast to uplink/downlink (UL/DL) communications where the transmission and reception point (TRP) is normally at building height (either in the façade or on the roof). This makes SL communications susceptible to blockages (e.g., by vehicles, pedestrians and other objects at ground level). As such, operation at FR2 can be challenging, as the dominant propagation path can become obstructed, causing the SL communication to fail until an alternative SL communication link is established (e.g., by performing a new beam alignment procedure to identify the new dominant propagation component). Even partial blockages can make the selected power, modulation, and coding scheme (PMCS) established during slot X, become severely deprecated as soon as slot X+1, and render any channel state information acquired from previous interactions between Tx and Rx useless.

To avoid such situations, SL devices may purposely introduce link redundancy in the form of spatial diversity transmission. In other words, instead of forming a single beam over a single propagation path (e.g., the LoS), the SL can benefit from spatial diversity by enabling the transmitter and/or receiver to form multiple beams along the $N>=2$ strongest propagation paths so that when one of the propagation paths becomes attenuated, there will be other propagation paths left to maintain the communication link without resorting to link adaptation and/or retransmission fallback options.

Figures 3A, 3B:
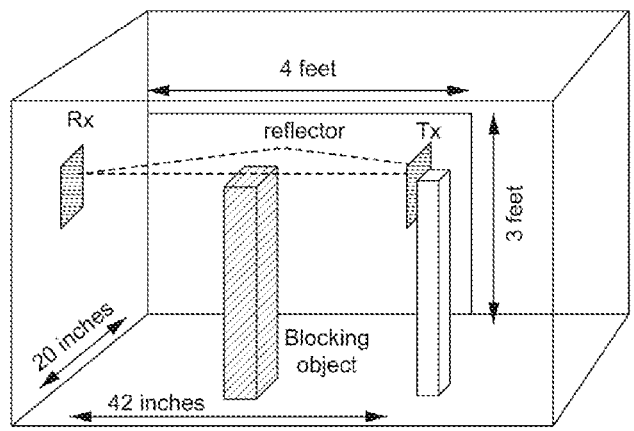
FIG. 3(a) illustrates an example beam transmission.
FIG. 3(b) illustrates a table of experimental results when line of sight (LoS) is attenuated.

FIG. 3(a) illustrates an example of using two transmit beams. Further, FIG. 3(b) illustrates a table of experimental results when LoS is attenuated. In particular, FIG. 3(a) illustrates the benefits of using two transmit beams, one in the direction of line of sight (LoS), and a second beam in the direction of the strongest reflector. As illustrated in FIG. 3(b), the results show that when LoS is attenuated, the gain of using a second beam (towards the reflector) is about 12 dB when the reflector is made of copper, and 4 dB when the reflector is made of wood. Furthermore, the performance gain by using two different beams is explained by the fact that the spatial diversity is beneficial to the decoder (i.e., the second beam channel conditions help the decoder recover from the errors it makes using the first beam signal).

However, to enable the introduction of spatial diversity into the NR SL design (i.e., to allow the selection of the best N communication links (beam pairs)), the transmitter and receiver may need to first agree on several items. For example, the transmitter and receiver may agree on the value of N. This may depend on the number of relevant multipath components of the SL channel but also on the number of distinct beams the Tx and Rx can generate (which is limited by the number of panels as well as the maximum allowed transmit power). This can limit the UE's ability to transmit on multiple beams in the same OFDM symbol or slot. The transmitter and receiver may also need to agree on how the transmissions on different beams map to different slots (i.e., whether the beams are used sequentially), with or without symbol gaps.

Additionally, the transmitter and receiver may need to agree on how the Tx UE selects the transmit beam indices for each of the N beamed SL transmissions. This may require the Tx UE to measure the SL channel in all directions, and select one beam per relevant direction (where relevant direction may mean a multipath with high enough power). Furthermore, the transmitter and receiver may need to agree on how the Rx UE selects the receive beam indices for each of the N beamed SL receptions. This may require that the Tx and Rx align their decision on how to schedule the usage of the different multipath components. For example, slot x may be reserved for exploiting multipath component k; then, both Tx and Rx may know that for slot x, they should use the beams corresponding to multipath component k. Furthermore, the transmitter and receiver may need to agree on how the Tx-Rx pair selects the PMCS for each path, the interference caused to surrounding UEs when selecting a specific Tx beam, and the interference received from surrounding UEs when selecting a specific Rx beam. With the above in mind, certain example embodiments may therefore provide a SL transmission procedure that addresses the issues described above, allowing UEs to introduce spatial diversity in FR. Accordingly, certain example embodiments may help maintain good SL quality for two mobile UEs, and enhance the range of SL communication.

There is currently no effective procedure on how to enable the Tx and Rx to perform the selection (e.g., what procedures allow the Tx-Rx pair to learn the SL channel and adapt the transceiver parameters to it). Thus, certain example embodiments may provide a holistic procedure that targets the link establishment using intentional spatial redundancy and addresses the above-described relationship between the transmitter and receiver.

Figure 4:
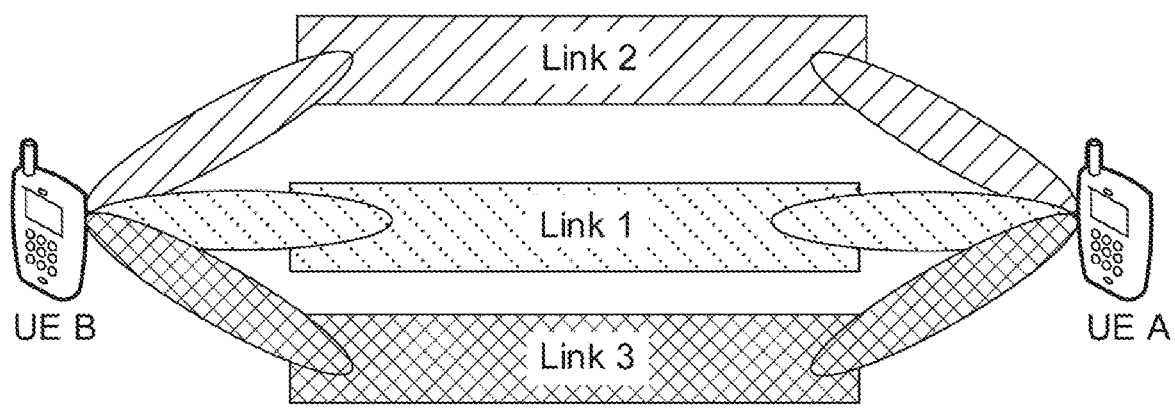
FIG. 4 illustrates an example communication between two UEs, according to certain example embodiments.

Certain example embodiments may provide an inter-UE coordination (IUC) procedure that allows a pair of SL UEs to establish multiple beam pairs that exploit the available propagation paths between them (e.g., the LoS and any other sufficiently strong non-LoS reflection paths), with the aim of increasing the robustness of the SL communications or enable multiple input multiple output (MIMO) operation at FR2 via the introduction of artificial spatial diversity. For instance, FIG. 4 illustrates an example communication between two UEs, according to certain example embodiments. In particular, FIG. 4 illustrates multiple propagation paths that are established between UE B and UE A via multiple beam pairs.

According to certain example embodiments, UE B may desire to communicate with UE A with higher reliability or higher throughput than allowed with a single propagation path. Additionally, UE B may transmit an IUC request to UE A requesting suitable resources for their communication over multiple propagation paths (hereafter referred to as "simultaneous links"); suitable resources refer to resources that maximize the success rate of the data transfer, while minimizing the interference towards other UEs. According to other example embodiments, UE B and UE A may exchange beamformed reference signals to identify several preferred resources and the corresponding multiple, distinct, and simultaneous links. According to further example embodiments, UE A may report to UE B the (non-)preferred resources and the links for their communication (from UE A's perspective). Additionally, in certain example embodiments, UE B may determine its own (non-)preferred resources and the associated links; UE B may then select resources and associated links based on its own preferences as well as UE A's reported preferences. Further, in certain example embodiments, UE B may transmit in the selected resources while utilizing the Tx beam(s) associated with the selected links. In other example embodiments, UE A may receive UE B's transmissions in the selected resources while utilizing the Rx beam(s) associated with the selected links. According to certain example embodiments, in the above procedures, UE Bko, may also report its resource/beam preferences (e.g., as part of the IUC request to UE A), and UE A may directly schedule the resources/beams to be used by UE B based on UE B's reported preferences as well as UE A's own preferences.

According to certain example embodiments, UE B (e.g., Tx UE) may desire to communicate with UE A (Rx UE), and the requirements of this communication (e.g., QoS, payload size, packet delay budget, periodicity of the transmissions for the case of SPS) may be such that this link should be as reliable as possible. This may trigger UE B to transmit an IUC request to UE A. Additionally, in certain example embodiments, UE B may transmit the IUC request to UE A, where the content of the IUC request may include a request to establish a reliable link with artificial spatial diversity (i.e., request to establish at least two and up to $N_1$ independent (non-spatial overlapped) beam pairs. These beam pairs may then be used to establish sequential links in time and/or to enable simultaneous links in the same time instant. For instance, in one example embodiment, UE B may indicate that it wants to establish at least two and up to $N_1$ independent (non-spatial overlapped) beam pairs, and then wait for UE A's instructions. Here, $N_1$ represents the UE B beamforming capabilities. However, these may not necessarily match the beamforming capabilities of UE A. Thus, the actual number of established beam pairs may be less or equal than $N_1$. In another example embodiment, UE B may indicate that it wants to establish at least two and up to $N_1$ independent (non-spatial overlapped) beam pairs, and also indicates that it will transmit $N_1$ reference signals each with a different non-spatial overlapped transmission beam in an upcoming set of resources/symbols. In certain example embodiments, these resources may be indicated as part of the $1^{st}$ stage SCI in the "Frequency resource assignment" and "Time resource assignment" fields, or as part of similar fields in a new $2^{nd}$ stage SCI or a new MAC CE. Furthermore, these resources may also be the remaining symbols of the SL slot.

In certain example embodiments, the content of the IUC request may also include additional details about the communication requirements (e.g., payload size, QoS, packet delay budget, periodicity of the transmissions for the case of SPS). In other example embodiments, the content of the IUC request may further include additional details on the UE B's capabilities. For instance, UE B's capabilities may include supported modulation and coding schemes (MCS) (with respect to the MCS tables defined in the specifications and indicating which MCS index ranges are supported). UE B's capabilities may also include supported transmission power. For example, this may include the maximum transmission power allowed by UE B as it can be lower than the maximum transmission power due to power back off towards the base station or due to some pre-existing request for UE B to minimize interference towards a nearby receiver other than UE A. According to certain example embodiments, this information may be provided in an angular form. For example, the radiated power limitation may be provided indexed to specific angles. According to other example embodiments, UE B's capabilities may include characteristics of the UE panels including, for example, the number of UE panels, the number of elements per panel, the panel geometry, the number of generated beams, the associated aperture, and their directivity. In other example embodiments, the content of the IUC request sent by UE B may include UE position. For example, when this information is available, it may be used by UE A to orient its Rx beams towards UE B.

According to certain example embodiments, UE A may receive the IUC request from UE B, and process it. For instance, in one example embodiment, UE A, based on its sensing of the resource pool, may determine which resources to use for the transmission of the reference signals to establish the beam pairs with UE B. These beam pairs may then be used to establish sequential links in time and/or to enable simultaneous links in the same time instant. In certain example embodiments, UE A may transmit the reference signals while applying a Tx beamformer, where UE B receives these beamformed reference signals by applying different Rx beamformers. From there, UE B may identify the beam pairs. After this process is completed, UE B may use the identified Rx beamformers as Tx beamformers by assuming reciprocity as it is expected that the same antenna panels will be used for the Tx and Rx operations. In other example embodiments, as UE B tests the different Rx beams, UE B may report back to UE A which beam pairs have been identified. In particular, the contents of this additional report from UE B to UE A may identify which of the Tx beamformers used by UE A will be used for the construction of the beam pairs.

In another example embodiment, when the UE A processes the IUC request from UE B, UE A may receive the different Tx beamformed reference signals from UE B in the resources indicated by UE B in the IUC request. Additionally, UE A may use different Rx beams to test how well a Tx beam and Rx beam match (e.g., by measuring the associated RSRP), and based on this procedure, may establish $N_2$ beam pairs; where $N_2$ is a function of the number of Rx beams that the UE A can generate and the number of useful propagation paths, which obeys the relation $N2<N_1$. In this example embodiment, UE B may transmit the reference signals and, thus, UE A may be testing the different Rx beams that it can generate against the different beamformed reference signals from UE B. In the example embodiments described above regarding UE A processing the received IUC request from UE B, the beam pair may be established and associated with an identification label such as an ID, an index or similar identifier. This beam pair identifier may allow the Tx (i.e., UE B) to identify which Tx beam it should use and allows the Rx (i.e., UE A) to identify which Rx beam it should use.

Additionally, in the example embodiments described above regarding UE A processing the received IUC request from UE B, UE A may be monitoring the resource pool while applying the identified Rx beams, associated with the identified beam pairs, to determine (non-)preferred resources for UE B to use in its transmission to UE A. This procedure may avoid selecting a resource in which UE A may suffer interference from other transmitting UEs, which could negate the benefit of the introduction of artificial spatial diversity. In certain example embodiments, the amount of beams that the UE A is capable of monitoring simultaneously may be dependent on the number of panels at the UE A. However, this capability may be implicit from the information of the identified (non-)preferred resources and which beam pairs these refer to. Furthermore, UE A may identify multiple sets of resources that are compatible with the use of the identified beam pairs or only to some of the beam pairs. Therefore, the determined (non-)preferred resources may be associated with the beam pairs where these are valid.

According to certain example embodiments, UE A may transmit an IUC message to UE B. The IUC message may include the identified (non-) preferred resources, and which beam pairs these refer to. In other example embodiments, the message may also include information that allows UE B to have the same understanding as UE A on which Tx and Rx beamformers are used in a given beam pair (e.g., that identifies a specific Tx beam based for example on the time instant/resource where the corresponding reference signal was transmitted).

In certain example embodiments, upon receiving the IUC message, UE B may become aware of the beam pairs to use as well as which resources (from the point of view of UE A) these beam pairs are usable on. For instance, in certain example embodiments, prior to reception of the IUC message from UE A, UE B may also monitor the SL resource pool for other nearby UEs' transmissions with the goal of identifying which resources can potentially be used for its own transmissions. This monitoring may follow the SL mode 2 sensing procedure, where the UE decodes the PSCCH ($1^{st}$ stage SCI) of all transmissions taking place in the SL resource pool during the sensing period. This may allow UE B to identify future transmissions from other UEs, based on the "Frequency resource assignment" and "Time resource assignment" fields of the $1^{st}$ stage SCI of the decoded transmissions from these same UEs. Accordingly, it may be possible to avoid selecting a resource in which UE B (Tx UE) may cause interference to other receiver UEs other than UE A.

According to certain example embodiments, upon UE B receiving the IUC message, the monitoring of the resource pool at UE B according to the methods described above may allow UE B to determine the (non-)preferred resources from its own perspective. Additionally, by applying different Rx beamformers in this sensing process, UE B may associate a spatial/directional component to the (non-)preferred resources. According to some example embodiments, upon UE B receiving the IUC message, UE B may then intersect the set of (non-)preferred resources obtained from UE A with its own set of (non-)preferred resources, to obtain the feasible set. This intersection procedure may also identify which beam pairs will be used, as it may be assumed that there is a mapping between a resource and the set of usable beam pairs.

In certain example embodiments, in a case where UE B determines that fewer beam pairs are usable (e.g., to avoid interference to another receiver) than the ones indicated by UE A in its IUC message, this information may need to be provided to UE A. In one example embodiment, this may be achieved as part of the transmission from UE B to UE A, either: (i) implicitly, where UE B will not use/transmit in the unusable beam pairs; or (ii) explicitly, where UE B will include as part of its transmitted payload an indication that only a few beam pairs will be used. In another example embodiment, this may be achieved as a separate signaling message that precedes the transmission from UE B to UE A.

According to certain example embodiments, upon selecting the resource(s) to use (and the associated beam pair(s)), UE B may proceed with the transmission. For instance, in one example embodiment, the transmission in each beam pair is performed in different SL slots, where the first transmission taking place indicates, on the "Frequency resource assignment" and "Time resource assignment" fields of the 1 St stage SCI, where the future transmissions (with different beams) will take place. This assumes that the order of the use of the beam pairs is part of the information previously shared between UE A and UE B (i.e., the ordering is part of the IUC exchanges). In another example embodiment, the $1^{st}$ stage SCI of each transmission associated with a specific beam may indicate the time and frequency resources (e.g., via the "Frequency resource assignment" and "Time resource assignment" fields in the $1^{st}$ stage SCI), and the corresponding beam identification so that the receiver knows which Rx beam to apply to receive the future transmission. Additionally, the initial transmission may be assumed to be on a pre-arranged beam (e.g., the strongest beam).

In certain example embodiments, when the UE B proceeds with the transmission, the transmission in each beam pair may be performed simultaneously in each symbol of the SL slots in the selected resources. Since there is a radiated power limit, UE B may assign the available transmission power per beam pair. According to some example embodiments, this may include the reduction of the power in a given direction to make the beam pair usable (i.e., reducing the power and minimizing the interference in a given direction). In further example embodiments, the use of a single mode may be limited by either UE B's or UE A's capabilities (e.g., one of the UEs has a single panel and therefore is only able to listen or transmit in one direction at a time). Alternatively, UE B may alternate between modes according to the availability of the resources and beam pairs.

According to certain example embodiments, UE A may receive the data transmission from UE B in the selected resource(s) while applying the agreed beam pair(s). For instance, in one example embodiment, UE A may receive the transmission in the different slots with the corresponding Rx beamformer and can combine the different transmissions before decoding (e.g., soft combining), or decode each transmission separately. In another example embodiment, UE A may combine the different links according to a preferred strategy (e.g., UE A may jointly estimate the data bits using all links simultaneously). The procedures described above on the establishment of multiple propagation paths may enable spatial diversity, which may be exploited to increase reliability (e.g., each path may be used to send a repetition or encoding of the same transport block), or to increase throughput by enabling spatial multiplexing of parallel data streams.

According to certain example embodiments, establishment of the beam pairs may involve the transmission of the Tx beamformed reference signals, as this may allow the Rx to select the best Rx beamformer to apply to receive a transmission beamformed with a specific Tx beamformer. The beam pairs used in certain example embodiments may be established after the best Tx beamformer is matched to the best Rx beamformer. The identification of a best Tx beamformer, at the transmitter, and the best Rx beamformer, at the receiver, may be based on pairing all different available Tx and Rx beamformers, and then selecting the pairs for which an associated link quality (e.g., RSRP, RSRQ) is maximized. In one example embodiment, assuming three available Tx beamformers at the transmitter, and two available Rx beamformers at the receiver, 3×2 Tx and Rx beamformers may be evaluated in terms of achievable RSRP. The N best combinations of Tx and Rx beamformers may then be selected based on the measured RSRP.

Figure 5:
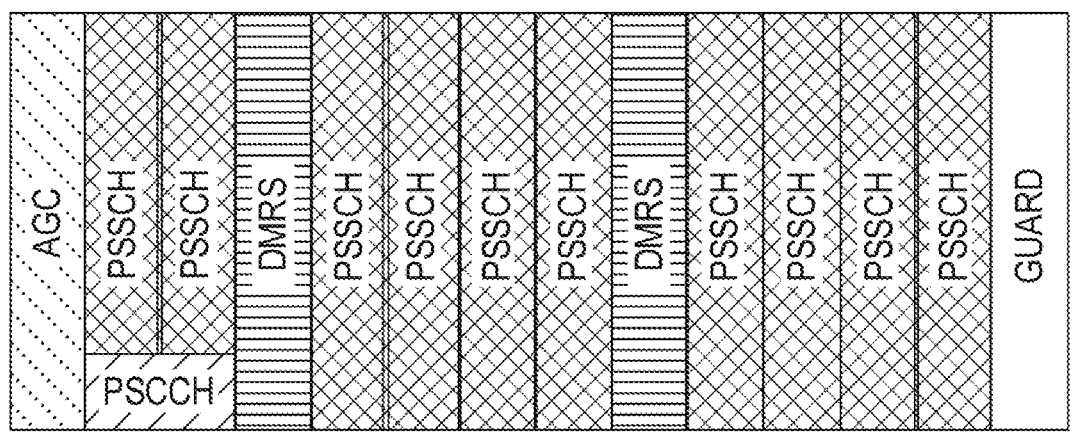
FIG. 5 illustrates an example implementation of all the symbols of a SL slot, according to certain example embodiments.
Figure 6A:
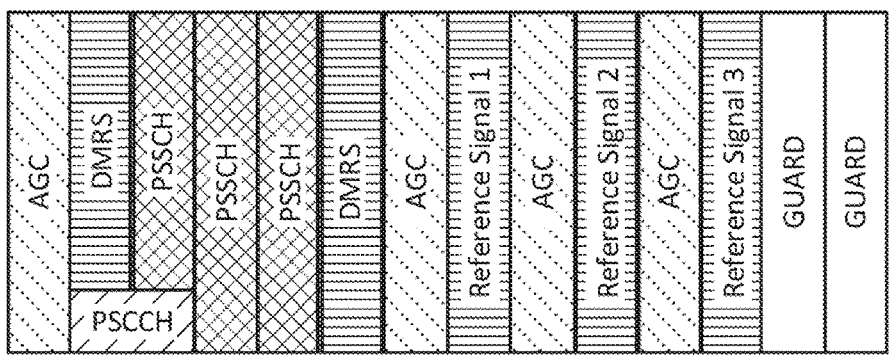
FIG. 6(a) illustrates an example implementation of a channelization of multiple reference signals, according to certain example embodiments.
Figure 6B:
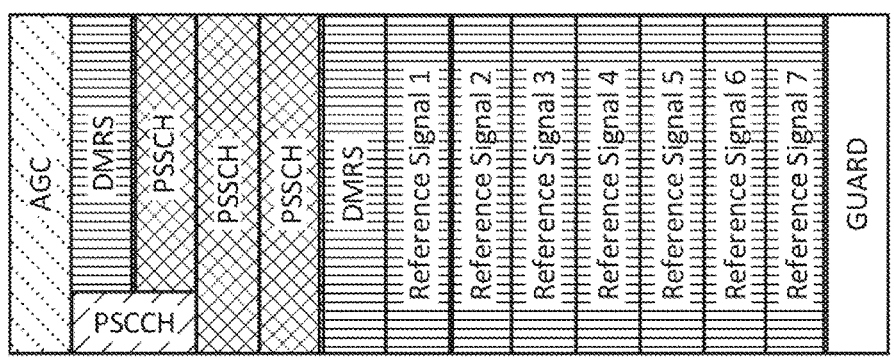
FIG. 6(b) illustrates an example implementation of another channelization of multiple reference signals, according to certain example embodiments.
Figure 6C:
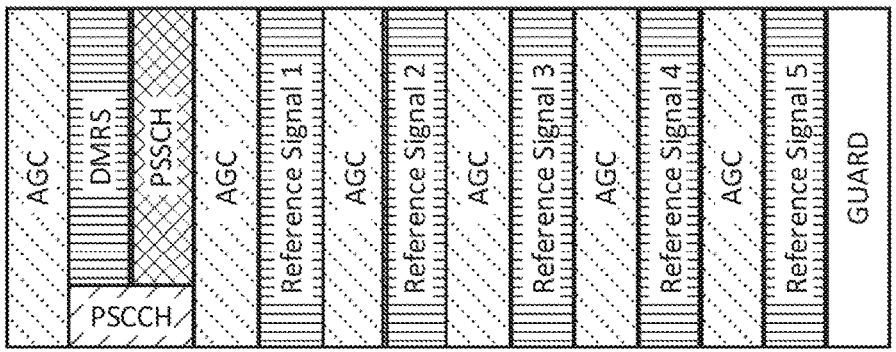
FIG. 6(c) illustrates an example implementation of another channelization of multiple reference signals, according to certain example embodiments.
Figure 6D:
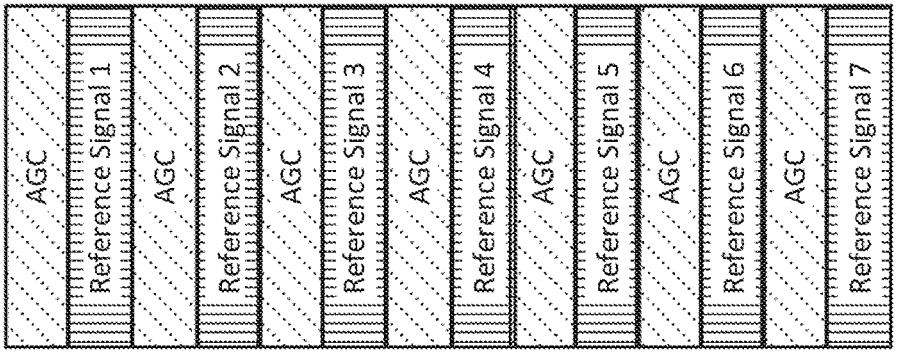
FIG. 6(d) illustrates an example implementation of another channelization of multiple reference signals, according to certain example embodiments.

FIG. 5 illustrates an example implementation of all the symbols of a SL slot, according to certain example embodiments. In particular, FIG. 5 illustrates an example of a SL slot structure format, where all the usable symbols (excluding the AGC and GUARD symbol) of the slot are used for transmission. Further, the PSCCH may occupy two symbols, and the DMRS may occur at symbols 3 and 8. As illustrated in FIG. 5, all the symbols of the SL slot may be beamformed with the same Tx beamformer, and then the Rx can apply different Rx beamformers in each of the slot symbols to determine the best matching. To further aid this matching, the payload contained in the PSSCH may be a known payload at the Rx and therefore each symbol can be considered as a reference signal.

FIGS. 6($a$)-6($d$) illustrate examples of implementations of the channelization of multiple reference signals each applied with a specific Tx beamformer, according to certain example embodiments. For instance, in FIG. 6($a$), the specific Tx beamformer may be built on top of the existing NR SL slot structure and, thus, is backward compatible and assumes that there is an AGC symbol preceding each new reference signal transmission. In FIG. 6($b$), no AGC symbol precedes a reference signal. Further, in FIG. 6($c$), the introduction of a new slot structure format may be needed, but can still coexist with other normal transmissions in a NR SL resource pool. Additionally, in FIG. 6($d$), non-backwards compatible slot structure may be dedicated for the transmission of reference signals, which may need a dedicated resource pool or dedicated resources in a resource pool.

In other example embodiments, the use of existing SL slot formats where part of the slot symbols is unused may be used instead to the transmission of the reference signals. In one example embodiment, each reference signal may be transmitted with a different Tx beamformer and, thus, to allow the Tx to change the Tx beamformer and the Rx to change the Rx beamformer and also adjust its AGC, a AGC symbol precedes each reference signal as illustrated in FIG. 6($a$). When the same Tx beamformer is applied in all reference signals, then the AGC symbol may not necessarily be required. Thus, the slot format illustrated in FIG. 6($b$) may be instead adopted. In less conservative implementations (i.e., non-backwards compatible with the current SL design and where coexistence with normal SL transmissions is not assured), it may be possible to have the slot structure examples illustrated in FIGS. 6($c$) and 6($d$). In these cases, the introduction of the AGC symbol may allow the Tx beamformer change and AGC correction at the Rx UE. However, from these examples, a case could be derived where the AGC symbol is not present and the slot is composed only by reference signal symbols. Any eventual delay incurred by the Tx beamformer change can then be compensated, for example, by the repetition of the reference signals at the Tx side (which is what already happens with the AGC symbol), and compensation at the Rx side.

Figure 7:
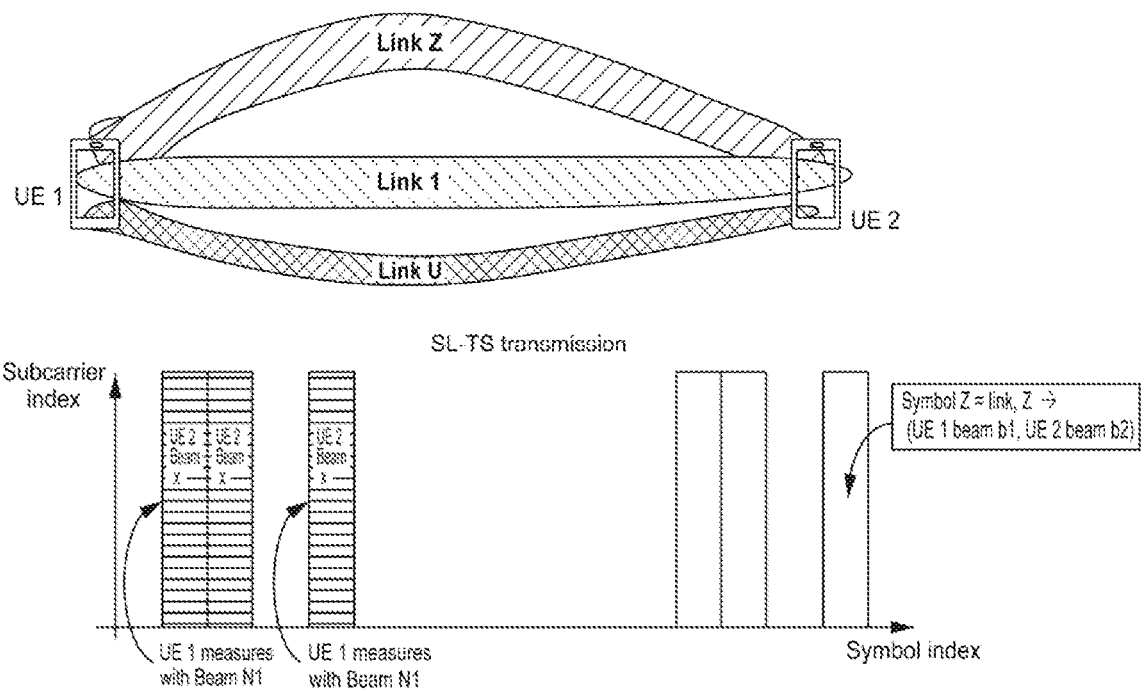
FIG. 7 illustrates an example of a sidelink training signal (SL-TS) configuration, according to certain example embodiments.
Figure 8:
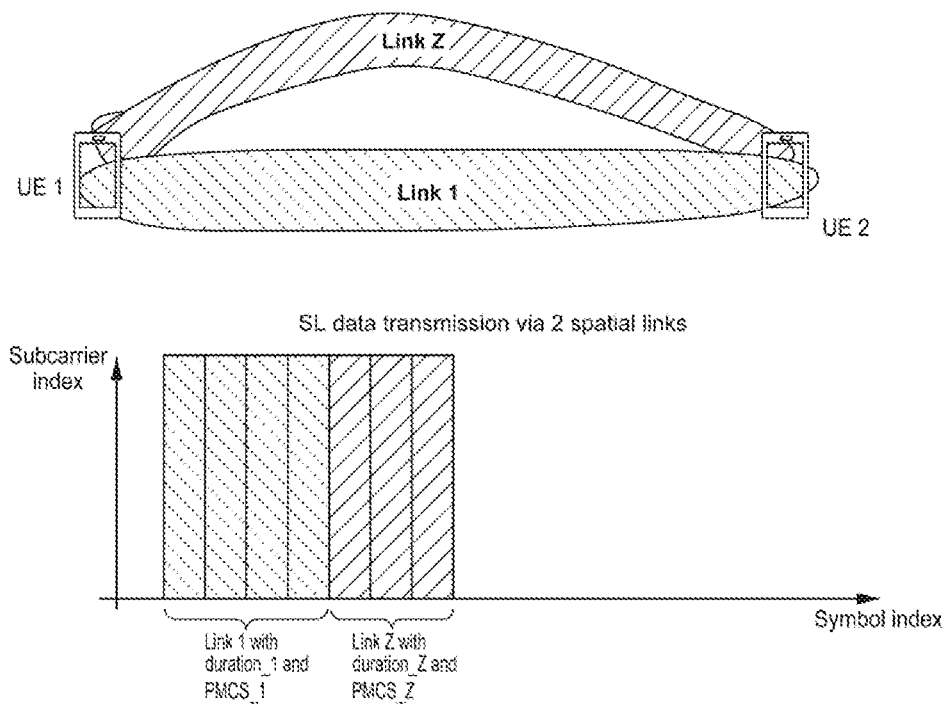
FIG. 8 illustrates an example multi-link SL transmission, according to certain example embodiments.

FIG. 7 illustrates an example of a sidelink training signal (SL-TS) configuration, according to certain example embodiments. Further, FIG. 8 illustrates an example multi-link SL transmission, according to certain example embodiments. Certain example embodiments may provide alternatives to the inter-UE coordination framework. For instance, the intentional spatial redundancy (i.e., via multi-link Tx-Rx) may be realized via a multi-step approach, such as that described below. In certain example embodiments, the link establishment may be led by the Rx UE (i.e., the Rx UE may make the decisions). In an alternative example embodiment, the same procedure may be Tx-led, or mutually agreed, in a double-handshake type of approach.

According to certain example embodiments, in the Rx-led procedure, the Tx UE (i.e., UE1) may send its Tx capabilities to the Rx UE (i.e., UE2). Specifically, the number of independent (non-spatial overlapped) beams the Tx UE can generate may be $N_1$. Further, the sent capabilities may relate to the PMCS the Tx UE can support, UE power constraints (e.g., power class), the capability to change beam (e.g., sub-symbol, symbol, or slot level), and the aperture of the generated beams. According to other example embodiments, UE2 may evaluate the report and select the minimum number of SL beams, (e.g., N=min(N1, N2)), where N2 is the number of receiving beams that UE2 can generate. UE2 may also define a sidelink training signal (SL-TS) consisting of Rx-specific reference symbols (RS) to be measured by the Tx UE. In addition, according to an example embodiment, the SL-TS may be a full-loaded RS signal with a duration of D=k*N1*N2 symbols, where k>=1 is a constant that determines the repetition rate. The duration D may ensure that UE1 can measure at least once, each of the N2 beams with each of its N1 beams. Further, according to another example embodiment, the SL-TS transmission may take place over a SL slot, where the PSCCH ($1^{st}$ stage SCI) indicates which of the remaining slot symbols are being used for SL-TS transmission. One added benefit of this approach is that it allows other UEs in the surrounding of UE2 (not necessary UE1) to train their Tx beams (by assuming Tx-Rx reciprocity) in order to avoid the direction of UE2.

In other example embodiments, during the Rx-led procedure, UE2 may inform UE1 about the SL-TS configuration via PC5-RRC or a SL MAC CE, which would include the following information: resource pool, time slot and sub-channel allocation, SL-TS code ID. This SL-TS configuration may request the Tx-UE to report the indices of the best N links (where the link quality may be decided on measurements like RSRP, SNR, etc.). Depending on the SL-TS allocation, the indices may for example refer to the symbol indices within the SL slot of the best N links. In an example embodiment, mapping between the symbol index (i.e., the link index), and the beam index may be known by both UE1 and UE2. In other words, when UE1 reports slot index X, UE2 knows that the slot contains the signal sent from own beam b2.

According to certain example embodiments, during the Rx-led procedure, UE1 may measure and report the best measurements (e.g., via a SL CSI report) as instructed by additionally attaching the link quality for each symbol index (e.g., symbol X—RSRP Y). The best measurements to be reported may be selected from the set of all available measurements based on a RSRP criteria. In one example embodiment, the N best measurements may be selected based on RSRP in descending ordering. In another example embodiment, the best measurements may be selected based on these being above a RSRP threshold. In another example embodiment, the best measurements may be selected based these being above a RSRP threshold and the total number of best measurements being at most N. According to other example embodiments, UE2 may evaluate the report, and generate an ordered list with the PMCS selection per link: (link_a, PMCS_j, duration_a), (link_1, PMCS_k, duration_1), etc. This means that link_a is scheduled first and has a duration of duration_a symbols, link_1 is scheduled second etc. This list is communicated to UE 1.

In certain example embodiments, UE 1 may implicitly accept the configuration and trigger the SL transmission, knowing the mapping between the link index and its own beam index as acquired in the steps described above. In one example embodiment, the $1^{st}$ stage SCI of each transmission may be associated with a specific beam, and indicate the time and frequency resources (e.g., via the FRIV and TRIV fields in the $1^{st}$ stage SCI) and the corresponding beam identification, so that the receiver knows which Rx beam to apply to receive the future transmission. Additionally, the initial transmission may be assumed to be on a pre-arranged beam (e.g., such as the strongest beam based on the measured RSRP).

According to other example embodiments, during the Rx-led procedure, UE 2 may receive the multi-link SL payload with each of its N RX beams. Furthermore, UE 2 may combine the different links according to a preferred strategy (e.g., UE 2 may jointly estimate the data bits using all links simultaneously).

Figure 9:
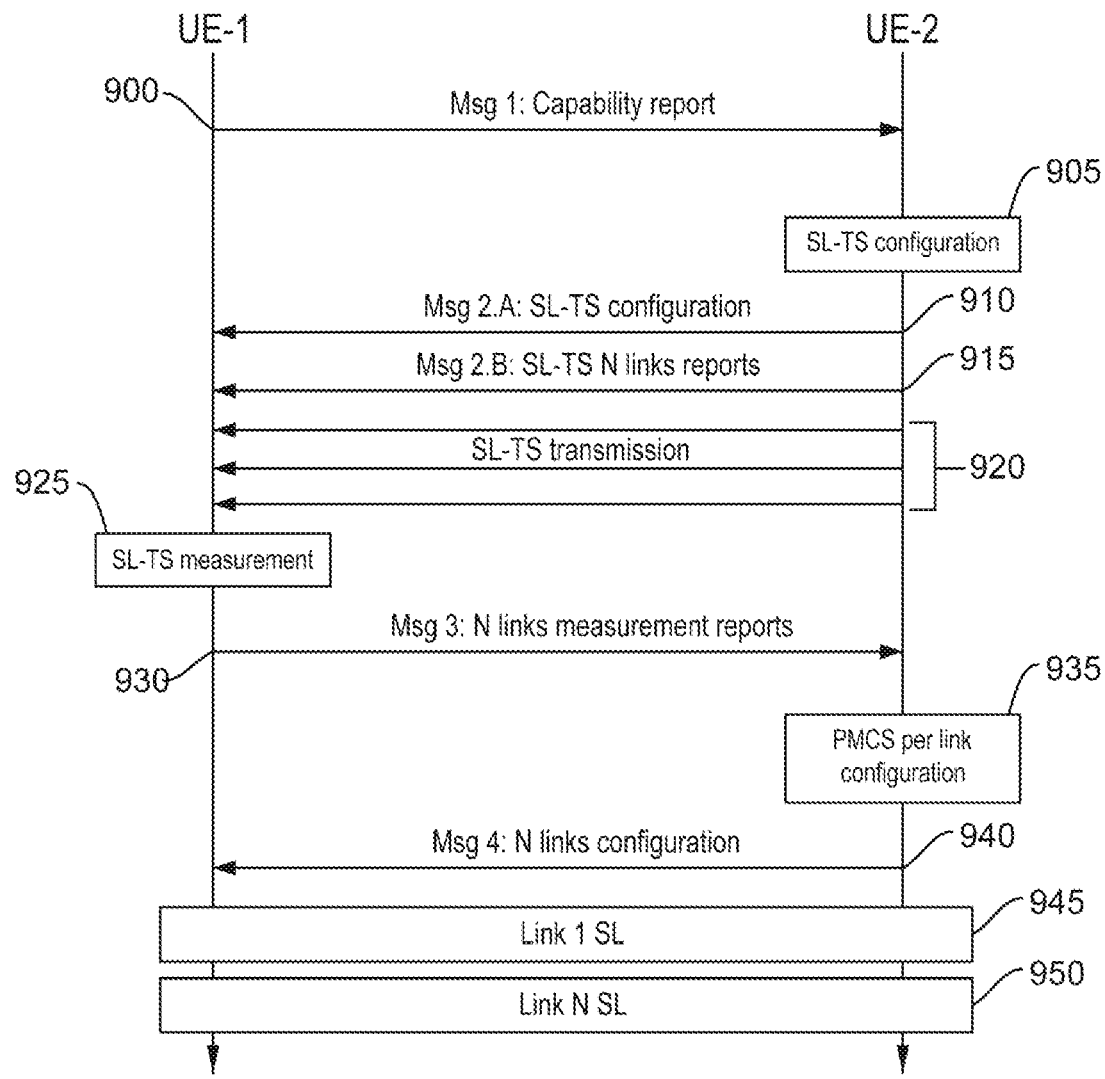
FIG. 9 illustrates an example signal diagram of an Rx-led multi-link establishment with SL-TS, according to certain example embodiments.

Certain example embodiments may involve an Rx-led multi-link establishment with SL-TS by UE 2. Here, the SL-TS configuration and transmission may be performed by, UE 2, as illustrated in FIG. 9. As illustrated in FIG. 9, at operation 900, UE 1 may send a capability report to UE 2. This capability report may include information about: (i) the number of independent (non-spatial overlapped) beams the TX UE can generate: N1; (ii) the power modulation coding scheme it can support; (iii) UE power constraints, e.g., power class; (iv) the capability to change beam (e.g., sub-symbol, symbol or slot level); and/or (v) the transmit beam shape e.g., aperture or width of the generated beams. At operation 905, UE 2 may select the SL-TS configuration based on the received capability report and, at operation 910, may send the SL-TS configuration to UE 1. At operation 915, UE 2 may also send SL-TS reports of N links to UE 1, and at operation 920, perform SL-TS transmissions to UE 1. As illustrated in FIG. 9, at operation 925, UE 1 may be in charge of collecting the multi-link measurements and, at operation 930, may report such measurements back to UE 2 which determines the link sequence (i.e., which link is exploited first). This may be needed so that both UEs can select the correct beam to Tx and respectively Rx the SL data. At operation 935, UE 2 may also determine the PMCS per link and link duration (i.e., the number of symbols used by each of the links) and, at operation 940, forward configuration of the N links to UE 1. At operations 945 and 950, a first SL and N SL may be established between UE 1 and UE 2.

According to certain example embodiments, UE 1 may report the indices of the best N links, and the QoS of each link, where QoS is a mutually agreed set of metrics characterizing the link (e.g., RSRP, TOA, etc.). In some example embodiments, Msg 1 and Msg 2 may be a PC5-RRC configuration message, and the SL-TS transmission may occur in specific SL slots.

Figure 10:
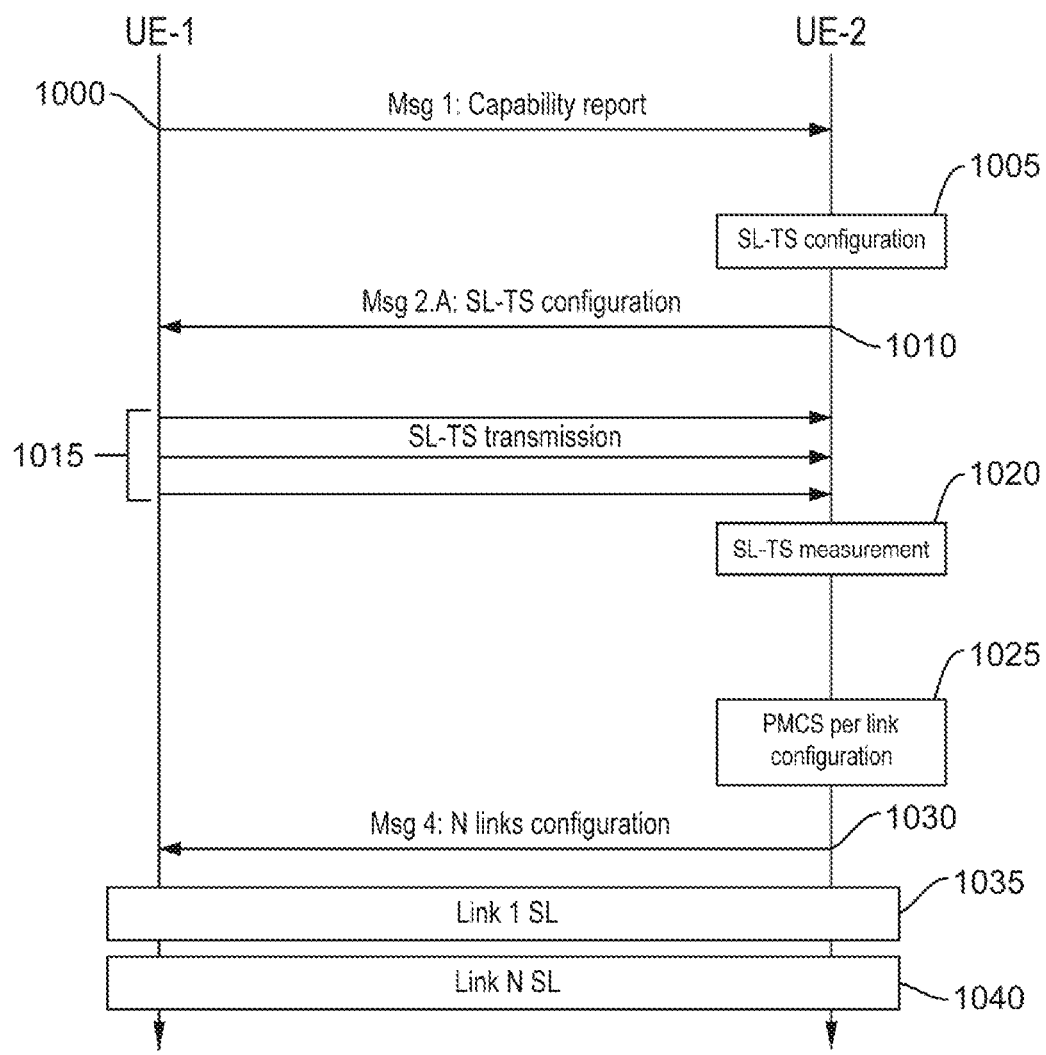
FIG. 10 illustrates an example signal flow diagram of an Rx-led multi-link establishment, according to certain example embodiments.

In other example embodiments, there may be provided an Rx-led multi-link establishment with SL-TS by UE 1. For instance, FIG. 10 illustrates an example signal flow diagram of an Rx-led multi-link establishment, according to certain example embodiments. As illustrated in FIG. 10, operations 1000, 1005, 1010, 1035, and 1040 may be respectively similar to operations 900, 905, 910, 945, and 950 in FIG. 9. At operation 1015, UE 1 may perform the SL-TS transmission to UE 2 based on the SL-TS configuration and, at operation 1020, UE 2 may collect the multi-link measurements. Further, at operation 1025, UE 2 may configure the PMCS per link and, at operation 1030, may send the configuration for N links to UE 1. In this example embodiment, computational overhead may be incurred by UE 2 since UE 2 is tasked with both measuring SL-TS, and configuring PMCS per link. Such a situation may occur if UE 1 is power-limited or power-impaired (e.g., low battery levels).

Figure 11:
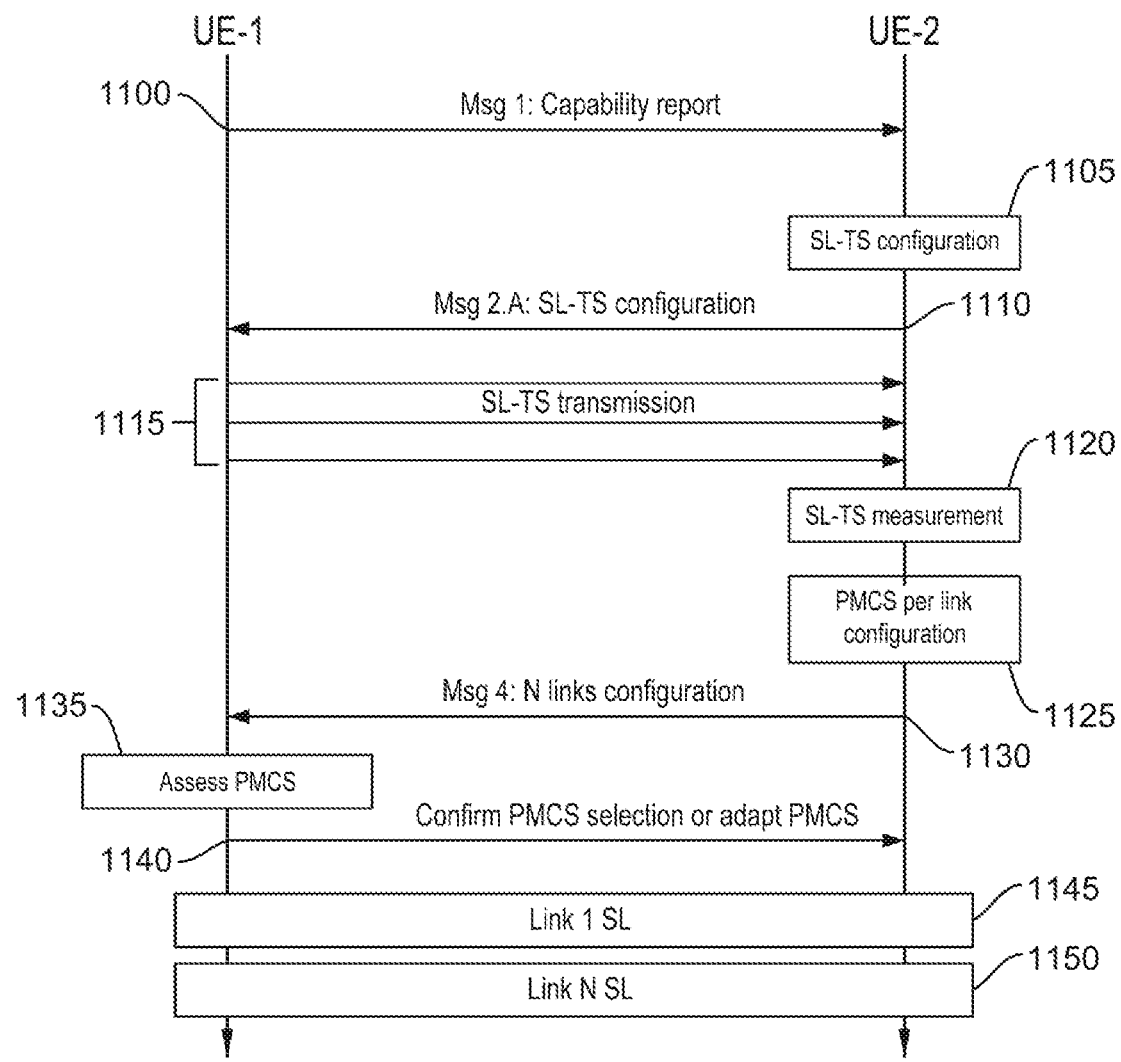
FIG. 11 illustrates an example signal flow diagram of a joint multi-link establishment, according to certain example embodiments.

According to further example embodiments, there may be provided a joint multi-link establishment. For instance, FIG. 11 illustrates an example signal flow diagram of the joint multi-link establishment, according to certain example embodiments. As illustrated in FIG. 11, operations 1100, 1105, 1110, 1115, 1120, 1125, 1130, 1145, and 1150 may be respectively similar to operations 1000, 1005, 1010, 1015, 1020, 1025, 1030, 1035, and 1040. FIG. 11 also illustrates that UE 1 and UE 2 may negotiate the PMCS selection per link. Specifically, after the SL-TS have been measured, an initial PMCS selection may be performed by UE2, and communicated to UE 1. At operation 1135, UE 1 (i.e., the SL transmitter), may assess the configuration, and may accept it or adapt it (e.g., in case its power limitation becomes more stringent due to other ongoing SL activities). Once accepted, at operation 1140, UE 1 may confirm the PMCS selection or adapt PMCS, and indicate the confirmation or adaptation to UE 2.

According to certain example embodiments, the SL-TS configuration may include selection of a time-frequency-code allocation unique to each link. For example, the same SL-TS code (e.g., Zadoff-Chu sequence with fixed ID) may be used across links, and the distinction between links may be made via time separation (i.e., each link may be scheduled in a different time resource). Additionally, SL-TS may be scheduled with a fixed comb pattern in frequency per link or may occupy the full frequency grid. To configure an SL-TS transmission, certain parameters may need to be configured for each link. For instance, the parameters may include sequence type (e.g., Zadoff-Chu, Gold code), sequence generation (e.g., code ID), frequency pattern (e.g., comb), and repetition pattern in the time domain (i.e., the number of OFDM symbols occupied by one SL-TS).

In other example embodiments, the measurements of SL-TS may include detecting SL-TS (per link) by the receiving device and extracting a set of channel metrics as mutually agreed by UE 1 and UE 2. In certain example embodiments, each link may correspond to either one multipath component, or a cluster of multipath components (e.g., close together in angle and/or delay domain). Thus, SL-TS measurements may reflect the geometry of the reflectors and the presence or absence of LoS per link. Consequently, SL-TS measurements may consist of RSRP indicating how much the reflector associated with the link attenuates the signal, LoS indicator/probability, delay of the most relevant multipath component per link, and signal to noise ratio (SNR), signal to interference plus noise ratio (SINR), etc.

According to certain example embodiments, the block may be implemented with available RRM methods (e.g., link adaptation based) for selecting power, modulation, and coding scheme using the channel state information provided by the UE performing SL-TS measurements. The method may also account for Tx UE type (e.g., power class when selecting a transmission scheme).

Figure 12:
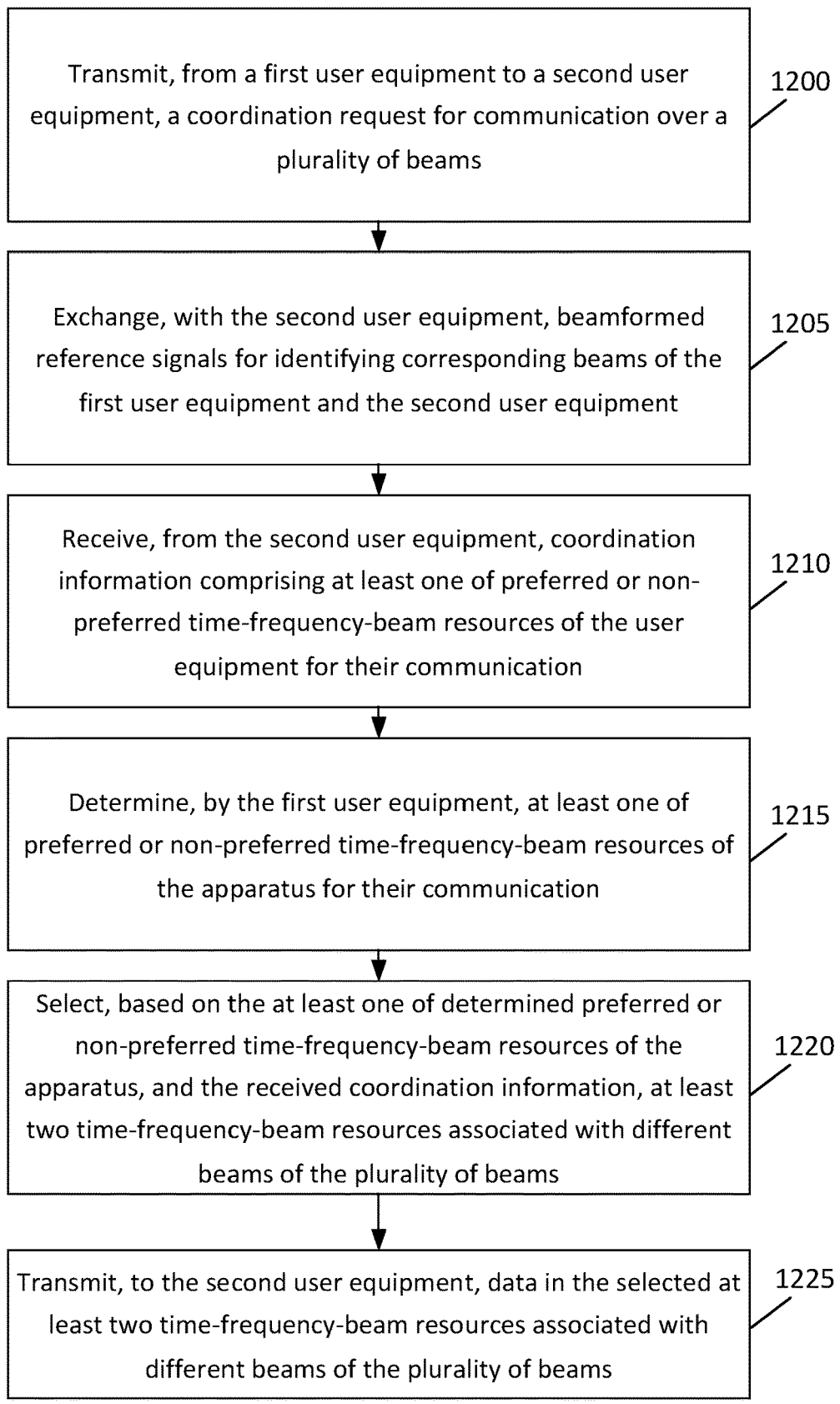
FIG. 12 illustrates an example flow diagram of a method, according to certain example embodiments.

FIG. 12 illustrates an example flow diagram of a method, according to certain example embodiments. In an example embodiment, the method of FIG. 12 may be performed by a network entity, or a group of multiple network elements in a 3GPP system, such as LTE or 5G-NR. For instance, in an example embodiment, the method of FIG. 12 may be performed by a UE similar to one of apparatuses 10 or 20 illustrated in FIGS. 14(a) and 14(b).

According to certain example embodiments, the method of FIG. 12 may include, at 1200, transmitting, from a first user equipment to a second user equipment, a coordination request for communication over a plurality of beams. At 1205, the method may include exchanging, with the second user equipment, beamformed reference signals for identifying corresponding beams of the first user equipment and second user equipment. Further, at 1210, the method may include receiving, from the second user equipment, coordination information comprising at least one of preferred or non-preferred time-frequency-beam resources of the user equipment for their communication. In addition, at 1215, the method may include determining, by the first user equipment, at least one of preferred or non-preferred time-frequency-beam resources of the first user equipment for their communication. At 1220, the method may include selecting, based on the at least one of determined preferred or non-preferred time-frequency-beam resources, and the received coordination information, at least two time-frequency-beam resources associated with different beams of the plurality of beams. Further, at 1225, the method may include transmitting, to the second user equipment, data in the selected at least two time-frequency-beam resources associated with different beams of the plurality of beams.

According to certain example embodiments, the subset of preferred or non-preferred resources and associated simultaneous links may be selected based on preferences of the first user equipment and preferences of the second user equipment. According to some example embodiments, the preferences of the first user equipment may be based on results of monitoring a sidelink resource pool to identify which resources can be used for transmissions. According to other example embodiments, the method may also include indicating a preference to establish at least two and up to $N_1$ independent simultaneous links, and waiting for instructions from the second user equipment, or indicating a preference to establish at least two and up to $N_1$ independent simultaneous links, and indicating transmission of $N_1$ reference signals, each with a different non-spatial overlapped beam in an uplink set of resources or symbols.

In certain example embodiments, the coordination request may include at least one of communication requirements between the first user equipment and the second user equipment, supported modulation and coding schemes of the first user equipment, a maximum transmission power allowed by the first user equipment, and position information of the first user equipment. In some example embodiments, the coordination information may further include information identifying which transmission and reception beamformers are used in a given simultaneous link. In other example embodiments, the transmission of data in each of the associated simultaneous links may be performed in different sidelink slots, or the transmission of data in each of the associated simultaneous links may be performed simultaneously in each symbol of a sidelink slot.

In various example embodiments, the communication requirements can comprise at least one of allowed packet delay latency, amount of data to be transmitted, or preferred transport block size, preferred active time for transmission of the user equipment, or time and frequency resources where the user equipment would prefer or not prefer to do its transmission.

Figure 13:
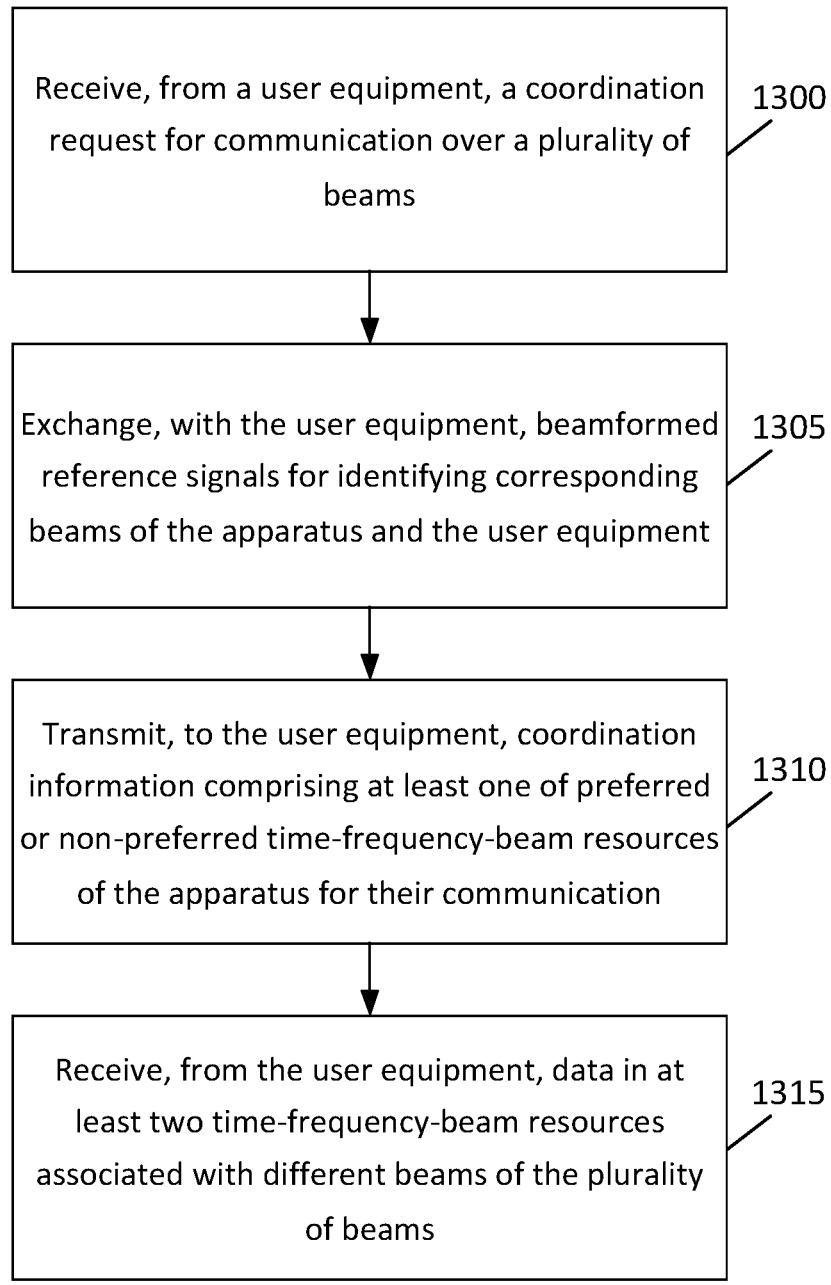
FIG. 13 illustrates an example flow diagram of another method, according to certain example embodiments.

FIG. 13 illustrates an example flow diagram of another method, according to certain example embodiments. In an example embodiment, the method of FIG. 13 may be performed by a network entity, or a group of multiple network elements in a 3GPP system, such as LTE or 5G-NR. For instance, in an example embodiment, the method of FIG. 13 may be performed by a UE similar to one of apparatuses 10 or 20 illustrated in FIGS. 14(a) and 14(b).

According to certain example embodiments, the method of FIG. 13 may include, at 1300, receiving, from a user equipment, a coordination request for communication over a plurality of beams. At 1305, the method may also include exchanging, with the user equipment, beamformed reference signals for identifying corresponding beams of the user equipment. Further, at 1310, the method may include transmitting, to the user equipment, coordination information comprising at least one of preferred or non-preferred time-frequency-beam resources for their communication. In addition, at 1315, the method may include receiving, from the user equipment, data in at least two time-frequency-beam resources associated with different beams of the plurality of beams.

According to certain example embodiments, the method may also include processing the coordination request based on sensing a pool of radio resources to determine which radio resources to use for transmission of reference signals to establish simultaneous links with user equipment. According to some example embodiments, the established simultaneous links may be associated with an identification label. According to other example embodiments, the method may further include monitoring the pool of radio resources while applying identified reception beams associated with identified simultaneous links.

In certain example embodiments, the method may also include receiving different transmission beamformed reference signals from the user equipment in radio resources indicated by the user equipment in the coordination request. In some example embodiments, the established simultaneous links may be associated with an identification label. In other example embodiments, the method may further include monitoring a pool of radio resources while applying identified reception beams associated with identified simultaneous links. According to certain example embodiments, the transmission may be received in different slots with a corresponding reception beamformer and/or the data may be performed using different beams, and received in the same slot. According to some example embodiments, the method may further include combining different simultaneous links according to a preferred strategy and/or the preferred strategy comprises jointly estimating the data using all beams simultaneously. According to other example embodiments, the method may also include transmitting a second request to the user equipment, the second request including information identifying which transmission and reception beamformers are used in a given simultaneous link.

FIG. 14(*a*) illustrates an apparatus 10 according to certain example embodiments. In certain example embodiments, the apparatus 10 may be a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 14(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 14(*a*).

Figure 14A:
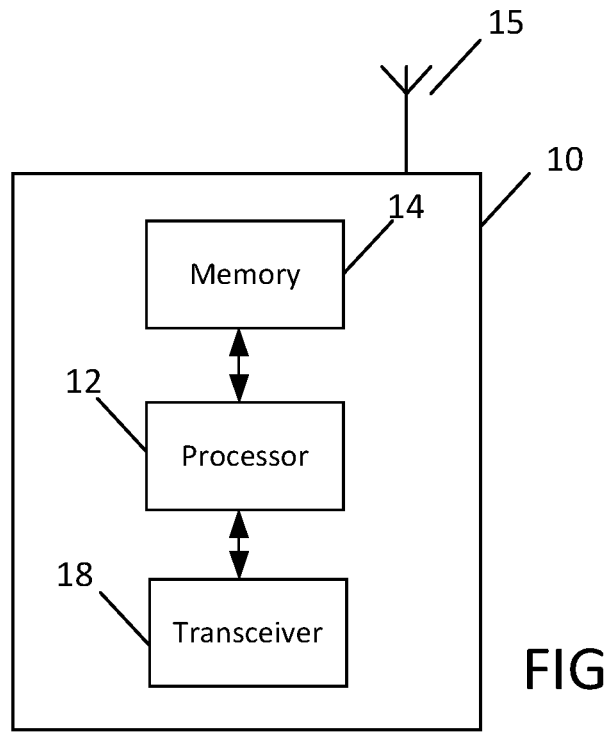
FIG. 14(a) illustrates an apparatus, according to certain example embodiments.

As illustrated in the example of FIG. 14*a*, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 14(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-13.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or non-volatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-13.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information onto a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to transmit, to a user equipment, a coordination request for communication over a plurality of beams. Apparatus 10 may also be controlled by memory 14 and processor 12 to exchange, with the user equipment, beamformed reference signals for identifying corresponding beams of the apparatus and the user equipment. Apparatus 10 may further be controlled by memory 14 and processor 12 to receive, from the user equipment, coordination information comprising at least one of preferred or non-preferred time-frequency-beam resources of the user equipment for their communication. In addition, apparatus 10 may be controlled by memory 14 and processor 12 to determine at least one of preferred or non-preferred time-frequency-beam resources of the apparatus for their communication. Further, apparatus 10 may be controlled by memory 14 and processor 12 to select, based on the at least one of determined preferred or non-preferred time-frequency-beam resources of the apparatus, and the received coordination information, at least two time-frequency-beam resources associated with different beams of the plurality of beams. Apparatus 10 may also be controlled by memory 14 and processor 12 to transmit, to the user equipment, data in the selected at least two time-frequency-beam resources associated with different beams of the plurality of beams.

According to other example embodiments, apparatus 10 may be controlled by memory 14 and processor 12 to receive, from a user equipment, a coordination request for communication over a plurality of beams. Apparatus 10 may also be controlled by memory 14 and processor 12 to exchange, with the user equipment, beamformed reference signals for identifying corresponding beams of the apparatus and the user equipment. In addition, apparatus 10 may be controlled by memory 14 and processor 12 to transmit, to the user equipment, coordination information comprising at least one of preferred or non-preferred time-frequency-beam resources of the apparatus for their communication. Further, apparatus 10 may be controlled by memory 14 and processor 12 to receive, from the user equipment, data in at least two time-frequency-beam resources associated with different beams of the plurality of beams.

Figure 14B:
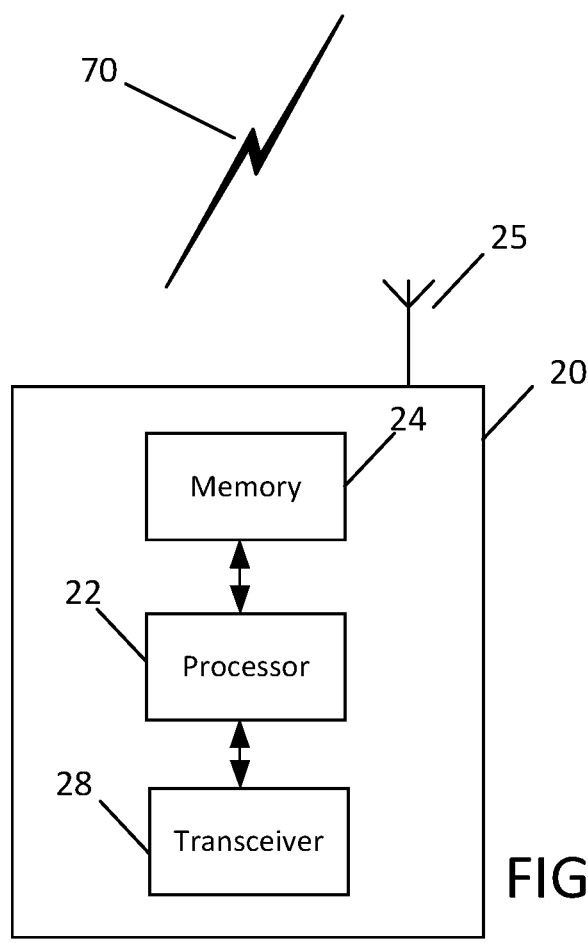
FIG. 14(b) illustrates another apparatus, according to certain example embodiments.

FIG. 14(b) illustrates an apparatus 20 according to certain example embodiments. In certain example embodiments, the apparatus 20 may be a node, core network element, or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 14(b).

As illustrated in the example of FIG. 14(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 14(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes of the various example embodiments described herein.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or non-volatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods of the various example embodiments described herein.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for transmitting, to a user equipment, a coordination request for communication over a plurality of beams. The apparatus may also include means for exchanging, with the user equipment, beamformed reference signals for identifying corresponding beams of the apparatus and the user equipment. The apparatus may further include means for receiving, from the user equipment, coordination information comprising at least one of preferred or non-preferred time-frequency-beam resources of the user equipment for their communication. In addition, the apparatus may include means for determining at least one of preferred or non-preferred time-frequency-beam resources of the apparatus for their communication. Further, the apparatus may include means for selecting, based on the at least one of determined preferred or non-preferred time-frequency-beam resources of the apparatus, and the received coordination information, at least two time-frequency-beam resources associated with different beams of the plurality of beams. The apparatus may also include means for transmitting, to the user equipment, data in the selected at least two time-frequency-beam resources associated with different beams of the plurality of beams.

Certain example embodiments may also be directed to an apparatus that includes means for receiving, from a user equipment, a coordination request for communication over a plurality of beams. The apparatus may also include means for exchanging, with the user equipment, beamformed reference signals for identifying corresponding beams of the apparatus and the user equipment. The apparatus may further include means for transmitting, to the user equipment, coordination information comprising at least one of preferred or non-preferred time-frequency-beam resources of the apparatus for their communication. In addition, the apparatus may include means for receiving, from the user equipment, data in at least two time-frequency-beam resources associated with different beams of the plurality of beams.

Certain example embodiments described herein provide several technical improvements, enhancements, and/or advantages. In some example embodiments, it may be possible to improve SL QoS since SL link adapted to the specific Tx-Rx conditions, leveraging between robustness (when the multiple paths are used for transport block repetitions), and throughput (when the multiple paths are used for different transport block such as, for example, enabling MIMO). According to other example embodiments, it may be possible to provide coverage enhancement for SL communication, improve decoding performance by leveraging inherence spatial diversity, reduce the frequency of beam reselection at either ends of the communication system, etc.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3$^{rd}$ Generation Partnership Project
5G 5$^{th}$ Generation
5GCN 5G Core Network
5GS 5G System
BS Base Station
CN Core Network
DL Downlink
E2E End-to-End
eNB Enhanced Node B
FR2 mmWave Bands
gNB 5G or Next Generation NodeB
IUC Inter-UE Coordination
LoS Line of Sight
LTE Long Term Evolution
NR New Radio
PMCS Power Modulation and Coding Scheme
QoS Quality of Service
RRM Radio Resource Management
RX Receiver
SL Sidelink
TX Transmitter UE User Equipment
UL Uplink
UMTS Universal Mobile Telecommunications System
UTRAN Universal Mobile Telecommunications System Terrestrial Radio Access Network

We claim:

1. An apparatus, comprising:
   at least one processor; and
   at least one memory comprising computer program code,
   wherein the at least one memory and the computer program code are configured, with the at least one processor, to cause the apparatus at least to
   transmit, to a user equipment, a coordination request for communication over a plurality of beams;
   exchange, with the user equipment, beamformed reference signals for identifying corresponding beams of the apparatus and the user equipment;
   receive, from the user equipment, coordination information comprising at least one of preferred or non-preferred time-frequency-beam resources of the user equipment for their communication;
   determine at least one of preferred or non-preferred time-frequency-beam resources of the apparatus for their communication;
   select, based on the at least one of determined preferred or non-preferred time-frequency-beam resources of the apparatus, and the received coordination information, at least two time-frequency-beam resources associated with different beams of the plurality of beams; and
   transmit, to the user equipment, data in the selected at least two time-frequency-beam resources associated with different beams of the plurality of beams.

2. The apparatus according to claim 1, wherein the subset of preferred or non-preferred resources and associated simultaneous links are selected based on preferences of the apparatus and preferences of the user equipment.

3. The apparatus according to claim 2, wherein preferences of the apparatus are based on results of monitoring a sidelink resource pool to identify which resources can be or not used for transmissions.

4. The apparatus according to claim 1, wherein the at least one memory and the computer program code are further configured, with the at least one processor to cause the apparatus at least to:
   indicate a preference to establish at least two and up to $N_1$ independent simultaneous links, and waiting for instructions from the user equipment; or
   indicate a preference to establish at least two and up to $N_1$ independent simultaneous links, and indicating transmission of $N_1$ reference signals, each with a different non-spatial overlapped beam in an uplink set of resources or symbols,
   wherein $N_1$ represents beamforming capabilities of the apparatus.

5. The apparatus according to claim 4, wherein the coordination request comprises at least one of:
   communication requirements between the apparatus and the user equipment,
   supported modulation and coding schemes,
   a maximum transmission power allowed by the apparatus,
   characteristics of panels of the apparatus, or
   position information of the apparatus.

6. The apparatus according to claim 5, wherein the communication requirements comprise at least one of:
allowed packet delay latency,
amount of data to be transmitted,
preferred transport block size,
preferred active time for transmission of the apparatus, or
time and frequency resources where the apparatus would prefer or not prefer to do its transmission.

7. The apparatus according to claim 1, wherein the coordination information further comprises information identifying which transmission and reception beamformers are used in a given simultaneous link.

8. The apparatus according to claim 1,
wherein the transmission of data in each of the associated simultaneous links is performed in different sidelink slots, or
wherein the transmission of data in each of the associated simultaneous links is performed simultaneously in each symbol of a sidelink slot.

9. An apparatus, comprising:
at least one processor; and
at least one memory comprising computer program code, wherein the at least one memory and the computer program code are configured, with the at least one processor, to cause the apparatus at least to receive, from a user equipment, a coordination request for communication over a plurality of beams;
exchange, with the user equipment, beamformed reference signals for identifying corresponding beams of the apparatus and the user equipment;
transmit, to the user equipment, coordination information comprising at least one of preferred or non-preferred time-frequency-beam resources of the apparatus for their communication; and
receive, from the user equipment, data in at least two time-frequency-beam resources associated with different beams of the plurality of beams.

10. The apparatus according to claim 9, wherein the at least one memory and the computer program code are further configured, with the at least one processor to cause the apparatus at least to:
process the coordination request based on sensing a pool of radio resources to determine which radio resources to use for transmission of reference signals to establish simultaneous links with user equipment,
wherein the established simultaneous links are associated with an identification label.

11. The apparatus according to claim 10, wherein the at least one memory and the computer program code are further configured, with the at least one processor to cause the apparatus at least to:
monitor the pool of radio resources while applying identified reception beams associated with identified simultaneous links.

12. The apparatus according to claim 10, wherein the at least one memory and the computer program code are further configured, with the at least one processor to cause the apparatus at least to:
receive different transmission beamformed reference signals from the user equipment in radio resources indicated by the user equipment in the coordination request,
wherein the established simultaneous links are associated with an identification label.

13. The apparatus according to claim 12, wherein the at least one memory and the computer program code are further configured, with the at least one processor to cause the apparatus at least to:
monitor a pool of radio resources while applying identified reception beams associated with identified simultaneous links.

14. The apparatus according to claim 9,
wherein the data is received in different slots with a corresponding reception beamformer, or
wherein the data is performed using different beams, and received in the same slot.

15. The apparatus according to claim 8, wherein the at least one memory and the computer program code are further configured, with the at least one processor to cause the apparatus at least to:
combine different beams according to a preferred strategy, wherein the preferred strategy comprises jointly estimating the data using all beams simultaneously.

16. The apparatus according to claim 9, wherein the at least one memory and the computer program code are further configured, with the at least one processor to cause the apparatus at least to:
transmit a second request to the user equipment, the second request comprising information identifying which transmission and reception beamformers are used in a given simultaneous link.

17. A method, comprising:
transmitting, from a first user equipment to a second user equipment, a coordination request for communication over a plurality of beams;
exchanging, with the second user equipment, beamformed reference signals for identifying corresponding beams of the first user equipment and the second user equipment;
receiving, from the second user equipment, coordination information comprising at least one of preferred or non-preferred time-frequency-beam resources of the second user equipment for their communication;
determining, by the first user equipment, at least one of preferred or non-preferred time-frequency-beam resources of the first user equipment for their communication;
selecting, based on the at least one of preferred or non-preferred time-frequency-beam resources of the first user equipment, and the received coordination information, at least two time-frequency-beam resources associated with different beams of the plurality of beams; and
transmitting, to the second user equipment, data in the selected at least two time-frequency-beam resources.

18. The method according to claim 17, wherein the subset of preferred or non-preferred resources and associated simultaneous links are selected based on preferences of the apparatus and preferences of the user equipment.

19. The method according to claim 18, wherein preferences of the apparatus are based on results of monitoring a sidelink resource pool to identify which resources can be or not used for transmissions.

20. A method, comprising:
receiving, from a user equipment, a coordination request for communication over a plurality of beams;
exchanging, with the user equipment, beamformed reference signals for identifying corresponding beams of the user equipment;

transmitting, to the user equipment, coordination information comprising at least one of preferred or non-preferred time-frequency-beam resources for their communication; and receiving, from the user equipment, data in at least two time-frequency-beam resources associated with different beams of the plurality of beams.

\* \* \* \* \*